US008772674B2

(12) United States Patent
Shimotsu

(10) Patent No.: US 8,772,674 B2
(45) Date of Patent: Jul. 8, 2014

(54) METHOD OF HEATING PLATED STEEL PLATE

(75) Inventor: Kouji Shimotsu, Soja (JP)

(73) Assignee: Asteer Co., Ltd., Okayama (JP)

( * ) Notice: Subject to any disclaimer, the term of this patent is extended or adjusted under 35 U.S.C. 154(b) by 131 days.

(21) Appl. No.: 13/367,127

(22) Filed: Feb. 6, 2012

(65) Prior Publication Data

US 2012/0205361 A1 Aug. 16, 2012

(30) Foreign Application Priority Data

Feb. 15, 2011 (JP) ................................ 2011-030039

(51) Int. Cl.

| | |
|---|---|
| ***C21D 1/40*** | (2006.01) |
| ***F23Q 7/00*** | (2006.01) |
| ***B29C 65/04*** | (2006.01) |
| ***H05B 6/62*** | (2006.01) |
| ***H05B 6/60*** | (2006.01) |
| ***H05B 6/54*** | (2006.01) |
| ***A23B 4/10*** | (2006.01) |
| ***B21J 5/00*** | (2006.01) |
| ***H05B 3/00*** | (2006.01) |

(52) U.S. Cl.
CPC ................ *C21D 1/40* (2013.01); *H05B 3/0004* (2013.01)
USPC ............ 219/162; 219/50; 219/61.2; 219/262; 219/265; 219/765; 219/770; 219/773; 219/780; 427/472; 427/398.1; 72/364; 428/615

(58) Field of Classification Search
USPC .......... 219/162, 50, 61.2, 265, 765, 770, 773, 219/780; 427/398.1; 428/653
See application file for complete search history.

(56) References Cited

U.S. PATENT DOCUMENTS

| | | | | | |
|---|---|---|---|---|---|
| 1,425,851 | A | * | 8/1922 | Gillan | 219/162 |
| 1,777,642 | A | * | 10/1930 | Harrington | 156/106 |
| 1,997,538 | A | * | 4/1935 | Armstrong | 428/638 |
| 2,835,776 | A | * | 5/1958 | Blessing | 219/765 |
| 3,313,269 | A | * | 4/1967 | Hough | 118/718 |
| 3,581,039 | A | * | 5/1971 | Kanzaki et al. | 219/73 |
| 3,582,608 | A | * | 6/1971 | Ito et al. | 219/137 R |
| 3,588,429 | A | * | 6/1971 | Gunther et al. | 19/50 |
| 3,591,754 | A | * | 7/1971 | Baldwin, Jr. | 219/50 |
| 3,602,688 | A | * | 8/1971 | Sibley | 219/137 R |
| 3,689,740 | A | * | 9/1972 | De Corso et al. | 219/383 |

(Continued)

FOREIGN PATENT DOCUMENTS

JP 2010-70800 A 4/2010

OTHER PUBLICATIONS

Wikipedia, "Permalloy" Internet article, p. 1 URL: http://en.wikipedia.org/wiki/Permalloy Retrieved on Dec. 16, 2013.

(Continued)

*Primary Examiner* — Dana Ross
*Assistant Examiner* — Gyounghyun Bae
(74) *Attorney, Agent, or Firm* — DLA Piper LLP (US)

(57) ABSTRACT

When applying a current to a plated steel plate, plating often biases. In the present invention, when applying a current, the current is applied with a flux guiding member arranged in proximity to a side surface of the plated steel plate. The direction of the magnetic flux at the side surface of the plated steel plate is corrected, and the bias of the plating is efficiently suppressed.

4 Claims, 6 Drawing Sheets

(56) References Cited

U.S. PATENT DOCUMENTS

| | | | | |
|---|---|---|---|---|
| 4,041,270 | A * | 8/1977 | Akahide et al. | 219/73 |
| 4,090,057 | A * | 5/1978 | Okada | 219/122 |
| 4,845,332 | A * | 7/1989 | Jancosek et al. | 219/645 |
| 4,973,500 | A * | 11/1990 | Ishii et al. | 427/436 |
| 5,124,527 | A * | 6/1992 | Takano et al. | 219/137.2 |
| 7,285,761 | B1 * | 10/2007 | Terziakin | 219/633 |
| 2004/0149723 | A1 * | 8/2004 | Furukawa et al. | 219/466.1 |
| 2008/0182122 | A1 * | 7/2008 | Chu et al. | 428/615 |
| 2010/0159237 | A1 * | 6/2010 | Watanabe et al. | 428/339 |
| 2011/0300407 | A1 * | 12/2011 | Cho et al. | 428/653 |

OTHER PUBLICATIONS

Merriam-Webster, "permeability" Internet article, p. 1 URL: http://www.merriam-webster.com/dictionary/permeability Retrieved on Dec. 9, 2013.

Wikipedia, "Permeability (electromagnetism)" Internet article, p. 1 URL: http://en.wikipedia.org/wiki/Permeability_(electromagnetism) Retrieved on Dec. 9, 2013.

* cited by examiner

Prior Art

METHOD OF HEATING PLATED STEEL PLATE

BACKGROUND OF THE INVENTION

1. Field of the Invention

The present invention relates to a method of heating a plated steel plate like a metal plated steel plate such as a tin plated steel plate, a zinc plated steel and others by directly applying a current to the plated steel plate. The heating method of the present invention is used in hot press processing of the plated steel plate, for example.

2. Description of the Related Art

Various heating methods are used when performing hot press processing on a plated steel plate. One of the methods is a method of heating the plated steel plate by directly applying a current to the plated steel plate. This method is called resistance heating or direct current application heating. This method uses the phenomenon that the plated steel plate generates heat in proportion to an electrical resistance thereof when the current is applied. This method has an advantage in that power can be converted to heat efficiently, and that the plated steel plate can be heated to a hardening temperature in a short time. The current applied to the plated steel plate may be either a direct current or an alternating current. Since commercial power is generally used as is, the alternating current is often used. When using the alternating current, increase in the electrical resistance by a skin effect is anticipated if the plated steel plate is thick, and hence the plated steel plate can be more efficiently heated.

When a current is directly applied to the plated steel plate to perform the hot press processing, the plating temporarily melts and becomes biased. For example, when a current is applied in the extending direction of the plated steel plate having a rectangular shape in plain view, the melted plating biases toward the middle in the width direction and heaps, and in contrast, the plating near the side surface becomes thin. The side surface as referred to herein is the end face parallel to the thickness direction and the extending direction of the plated steel plate. Since the plating prevents generation of a scale (oxide layer) on the surface of the heated plated steel plate or prevents generation of a rust after the hot press processing, when the plating is biased, the generation of the scale may not be prevented, or the rust preventing performance after the hot press processing may be impaired.

For example, paragraph [0007] of Japanese Unexamined Patent Publication No. 2010-070800 describes that when a large current is directly applied on the plated steel plate, an attracting force based on the Fleming's left hand rule is generated with respect to the melted plating by the current and the magnetic field generated by the current, and the attracting force becomes the cause of bias of the plating. In the invention of this publication, the current density is made small when the plating is thick whereas the current density is made large when the plating is thin to prevent the bias in the plating. Specifically, the current having a current density that satisfies the mathematical equation $I \leq (23-T)/0.0718$ described in claim 1 is applied. In this equation, I is the current density ($A/mm^2$) and T is the thickness (μm) of the plated layer. Furthermore, paragraph [0019] describes that when the thickness of the plating exceeds 22 μm, the amount of current flowed through the plated layer becomes large even if the current density is made small, whereby the attractive force based on the Fleming's left hand rule becomes large and the plating biases. Moreover, paragraph [0014] describes that the plating and the steel plate are rapidly alloyed when the thickness of the plating is sufficiently small, and hence the bias in the plating is effectively prevented.

In the invention of the above publication, the thickness of the plating needs to be within the range of greater than or equal to 2 μm and smaller than or equal to 22 μm, but a strict management of the film thickness is cumbersome. Moreover, there is a possibility that the scale may be generated or the rust may be produced at the time of the hot press processing when the film thickness is small. Furthermore, the electrical plating method, whose cost is high, is inevitably adopted to make the film thickness small and to strictly manage the film thickness, and hence the hot dip plating method, whose cost is low, is difficult to adopt.

It is an object of the present invention to provide a method of heating a plated steel plate capable of easily and conveniently resolving the bias in the plated layer without relying on the strict management of the film thickness and the control of the current density.

SUMMARY OF THE INVENTION

The present invention is a method of heating a plated steel plate by directly applying a current to the plated steel plate. The method includes the steps of connecting electrodes to the plated steel plate including side surfaces extending in a direction along which the applied current flows; arranging a pair of ferromagnetic flux guiding members, which has a wall surface orthogonal to the surface of the plated steel plate, along the side surfaces of the plated steel plate with an insulating gap provided between the side surfaces and the wall surface; and applying the current to the plated steel plate.

The present invention has a characteristic in applying a current after arranging an electromagnetic guiding member in proximity to the side surface of the plated steel plate. By arranging the electromagnetic guiding member, the direction of the magnetic flux generated by current application and the direction of the Lorentz force based thereon can be corrected, and the occurrence of bias in the plating can be prevented.

It is preferable that the current is applied with an insulating plate arranged in the insulating gap between the wall surface of the flux guide member and the side surface of the plated steel plate. The side surface and the wall surface can be brought closer by arranging the insulating plate. The position of the flux guiding member is also facilitated.

It is preferable that the flux guiding member includes a concaved groove having a cross-sectional shape that encompasses the side surface extending in the direction along which the applied current flows. The concaved groove is provided on the wall surface orthogonal to the surface of the plated steel plate. Furthermore, it is preferable that the current is applied with the insulating plate fitted to the concaved groove of the flux guiding member.

The flux guiding member can be brought closer to the side surface of the plated steel plate by providing the concaved groove in the wall surface of the flux guiding member. According to this, the direction of the magnetic flux at the side surface of the plated steel plate can be more appropriately corrected. Moreover, the positioning of the flux guiding member is facilitated by fitting the insulating plate in the concaved groove.

DETAILED DESCRIPTION OF THE PREFERRED EMBODIMENTS

In this specification, a magnetic flux generated around a plated steel plate 1 is referred to as "B", a magnetic flux parallel to the surface of the plated steel plate 1 is referred to as "Bp" or a "parallel component", magnetic flux orthogonal to the surface of the plated steel plate 1 is referred to as "Bo" or an "orthogonal component", Lorentz force derived from the parallel component is referred to as "Fp", and Lorentz force derived from the orthogonal component is referred to as "Fo".

Reviewing the influence of the magnetic field in the direct current application in detail, it has been found that the bias of the plating occurs by the Lorentz force (Fo) generated by the magnetic flux (orthogonal component Bo) orthogonal to the plated steel plate. First, a mechanism in which the bias occurs in the plating will be described with reference to FIG. 6 to readily understand the present invention.

Figure 6:
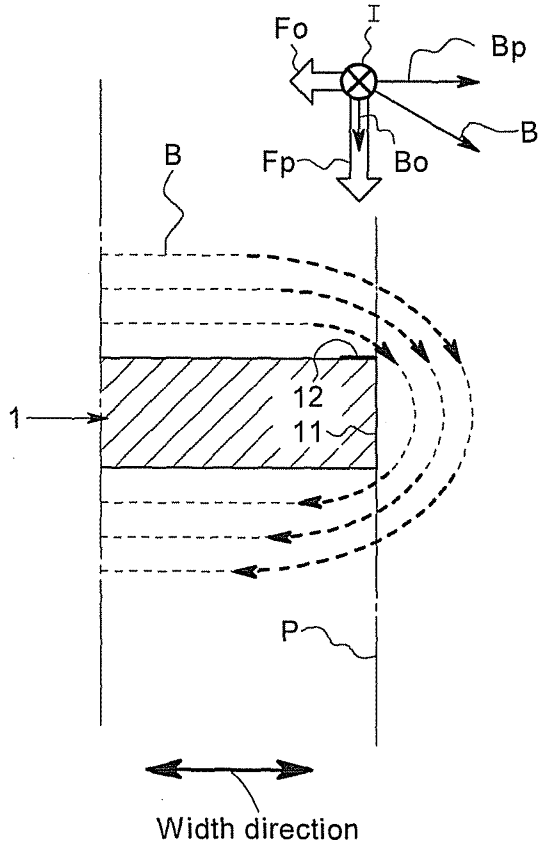
FIG. 6 is a cross-sectional view corresponding to FIG. 2 showing one example of a heating method of a plated steel plate by conventional direct current application.

When directly applying a current in the extending direction of the plated steel plate 1, the magnetic flux (B) that surrounds the cross-section in the width direction of the plated steel plate 1 is generated according to the corkscrew rule. In FIG. 6, the current flows from the near side to far side. As the current also flows to the melted plating, the Lorentz force based on the magnetic flux also acts on the plating. The magnetic flux of the portion parallel to the surface of the plated steel plate 1 is mostly parallel component (Bp). In this case, the Lorentz force (Fp) merely acts on the melted plating in the direction orthogonal to the surface of the plated steel plate 1. Therefore, the melted plating does not move, and the bias of the plating does not occur.

However, at a side surface 11 of the plated steel plate 1, the direction of the magnetic flux (B) is inverted so as to go around the side surface 11 from the upper surface to the lower surface of the plated steel plate 1. The magnetic flux (B) contains the orthogonal component (Bo) at the side surface 11. The Lorentz force (Fo) is generated toward the center in the width direction of the plated steel plate 1 in a melted plating 12 by the orthogonal component (Bo). This Lorentz force (Fo) moves the melted plating 12 toward the center in the width direction of the plated steel plate 1. The Lorentz force (Fo) derived from the orthogonal component (Bo) becomes weaker as it is farther away from the side surface 11 of the plated steel plate 1. However, as the melted plating 12 is sequentially pushed toward the center in the width direction of the plated steel plate 1, the plating 12 is biased to the center in the width direction of the plated steel plate 1 as a whole.

In case the alternating current is used, since the direction of the current interchanged, it seems that the Lorentz force (Fo) would become opposite and canceled. However, the direction of (Fo) does not changes in fact since the orthogonal component (Bo) also becomes opposite in accordance with the direction change of the current.

Therefore, in the present invention, the direction of the magnetic flux is corrected so as to reduce the orthogonal component (Bo) and increase the parallel component (Bp) of the magnetic flux (B) generated at the side surface 11 of the plated steel plate 1 by arranging a flux guiding member 3 in proximity to the plated steel plate 1 to which a current is applied. One example of a heating method of the present invention is shown in FIGS. 1 to 5.

Figure 1:
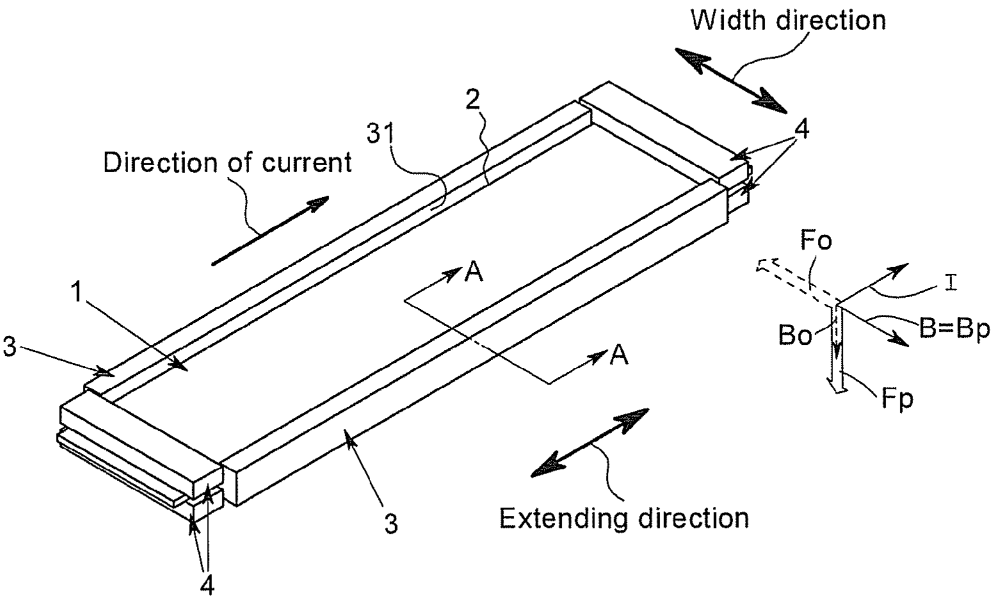
FIG. 1 is a perspective view showing one example of a heating method of the present invention in which a flux guiding member is arranged along a side surface of a plated steel plate.
Figure 2:
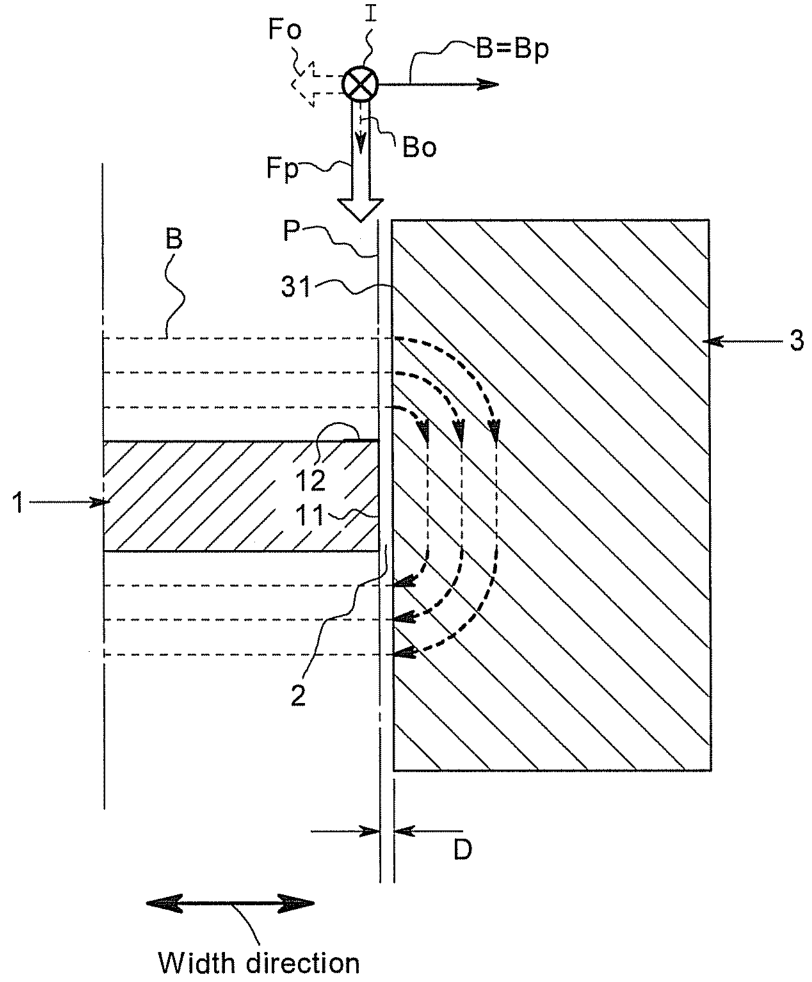
FIG. 2 is a cross-sectional view of portion A-A of FIG. 1.

FIG. 1 is a perspective view showing one example of a heating method of the present invention. FIG. 1 shows an example of heating a long plated steel plate 1 having a rectangular shape in plain view by applying a current. In this example, an electrode 4 is connected to both ends in the longitudinal direction of the plated steel plate 1. A side surface 11 of the plated steel plate 1 is exposed between the electrodes on the near side and the far side. The flux guiding members 3 are respectively arranged so that wall surfaces 31 face the side surfaces 11. In this case, as shown in FIG. 2, the upper surface and the lower surface of the plated steel plate 1 are orthogonal to the wall surface 31 of the flux guiding member 3 when the plated steel plate 1 is seen from the front side. When arranging the flux guiding member 3, an insulating gap 2 is provided between the wall surface 31 of the flux guiding member 3 and the side surface 11. The insulating gap 2 is provided to prevent the current from flowing from the plated steel plate 1 to the flux guiding member 3. The size of the insulating gap 2 is set to an extent that insulation breakdown does not occur between the plated steel plate 1 and the flux guiding member 3. If the electrode 4 and the flux guiding member 3 are in close contact, the current flows to the flux guiding member 3, and hence the insulating gap 2 is also provided between the electrode 4 and the flux guiding member 3. The order of applying the flux guiding member 3 and the electrode 4 to the plated steel plate 1 is not particularly limited, and either one may be applied first.

After the application of the flux guiding member 3 and the electrode 4 is completed, a current I is applied in the longitudinal direction of the plated steel plate 1 from the electrodes 4, 4. The current I may be a direct current or an alternating current. A state in which the current flows from the lower left toward the upper right in FIG. 1 will be hereinafter described by way of example to readily understand the present invention.

When the current I flows from the lower left to the upper right in FIG. 1, the magnetic flux (B) is generated around the cross-section cut along the short-side direction (width direction) of the plated steel plate 1, as shown in FIG. 2, according to the corkscrew rule. The magnetic flux (B) is illustrated as lines descending from the upper surface to the lower surface in FIG. 2. In the opposite side (left side) of the plated steel plate 1, the magnetic flux (B) ascends from the lower surface to the upper surface of the plated steel plate 1. In the present invention, the magnetic flux becomes orthogonal to the wall surface 31 since the flux guiding member 3 is arranged by the side surface 11 of the plated steel plate 1. At the side surface 11 of the plated steel plate 1, as shown with a broken line, the orthogonal component (Bo) of the magnetic flux (B) is reduced, and the Lorentz force (Fo) toward the center in the width direction of the plated steel plate 1 derived from the orthogonal component (Bo) can be reduced. On the contrary, the parallel component (Bp) increases at the side surface 11 of the plated steel plate 1, and the Lorentz force (Fp) derived therefrom increases. The Lorentz force (Fp) merely acts in the direction of holding down the plating 12, and does not cause bias in the melted plating 12.

Plural arrows above the upper side of the side surface 11 in FIG. 2 indicates a direction of a magnetic flux or a direction of force generated by Fleming' left hand rule. In FIG. 2, the current I flows through the plating 12 toward the far side in the direction orthogonal to the plane of drawing. If the flux guiding member 3 is not arranged as shown in FIG. 6, the magnetic flux (B) contains the orthogonal component (Bo) to no small extent, since it is greatly tilted at the upper side of the side surface 11 when the magnetic flux (B) goes around the side surface of the plated steel plate 1. However, if the flux guiding member 3 is arranged as shown in FIG. 2, the magnetic flux is corrected to be parallel to the plated steel plate 1 at the upper side of the side surface 11, and the orthogonal component (Bo) and the Lorentz force (Fo) based thereon are substantially eliminated, as shown with a broken line in FIG. 2. The melted plating 12 thus can be suppressed or prevented from biasing.

If a vertical plane P which coincides with the side surface 11 is assumed, the direction of the magnetic flux (B) on the vertical plane P influences mostly how the melted plating 1 flows. Therefore, it is preferable that vertical plane P is close to the flux guiding member 3 since the closer the flux guiding member 3 is with respect to the vertical plane P, the more orthogonal the magnetic flux (B) is with respect to the vertical plane P. However, short-circuit occurs if the flux guiding member 3 is brought too close to the plated steel plate 1 since the flux guiding member 3 is made from a solid block that is molded from a ferromagnetic body such as iron. Furthermore, when the flux guiding member 3 comes into contact with the plated steel plate 1, the heat escapes through the flux guiding member 3, thus inhibiting the temperature rise of the plated steel plate 1. Therefore, an insulating gap 2 having an insulating distance D is preferably provided between the wall surface 31 of the flux guiding member 3 and the side surface 11. The insulating distance D means a distance necessary to realize electrical insulation between the side surface 11 and the wall surface 31 and varies depending on a condition.

Figure 3:
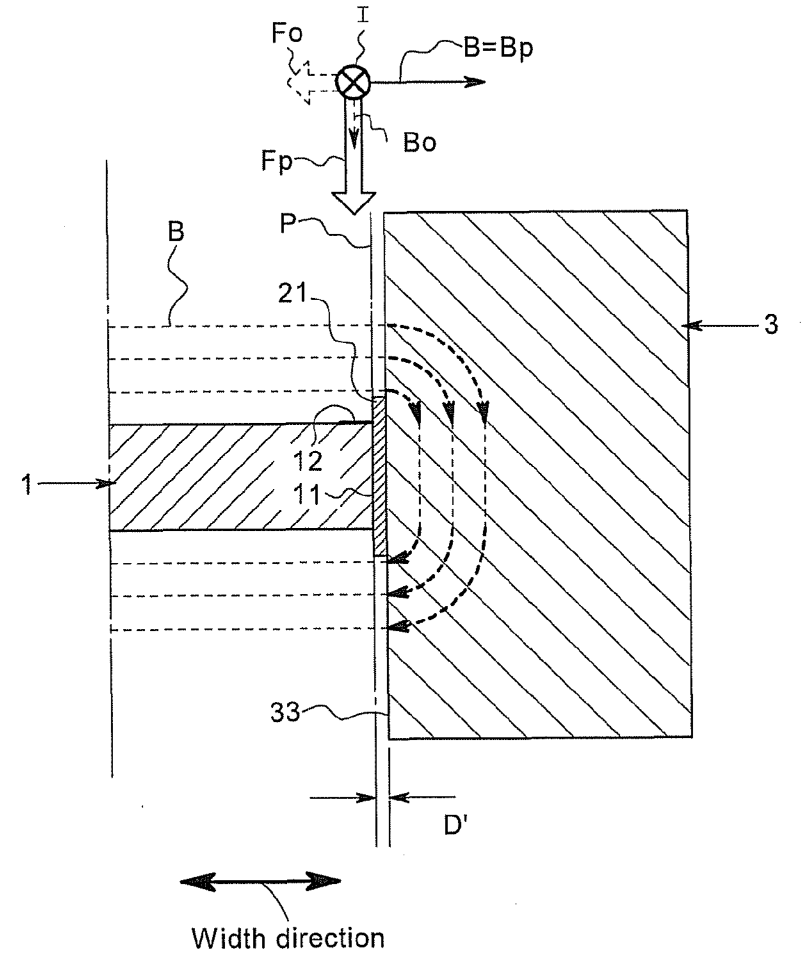
FIG. 3 is a cross-sectional view corresponding to FIG. 2 in which an insulating plate is interposed between the side surface of the plated steel plate and a wall surface of the flux guiding member.

The side surface 11 and the wall surface 31 can be brought closer by interposing an insulating plate 21 having heat insulating property between the side surface 11 and the wall surface 31, as shown in FIG. 3. Assuming the insulating distance when the insulating plate 21 is interposed as D', the relationship of D>D' can be met. Furthermore, the position of the flux guiding member 3 with respect to the plated steel plate 1 can be easily determined by bringing the flux guiding member 3 into contact with the insulating plate 21. In this example, the distance between the upper edges (lower edges) are spaced apart by greater than or equal to the insulating distance D in order to reliably prevent discharge (in particular, edge surface discharge) between the upper edge (lower edge) of the side surface 11 and the upper edge (lower edge) of the insulating plate 21. As the material of the insulating plate 21, ceramic or the like is preferably used. This is the same for the material of an insulating plate 23, to be described later.

Figure 4:
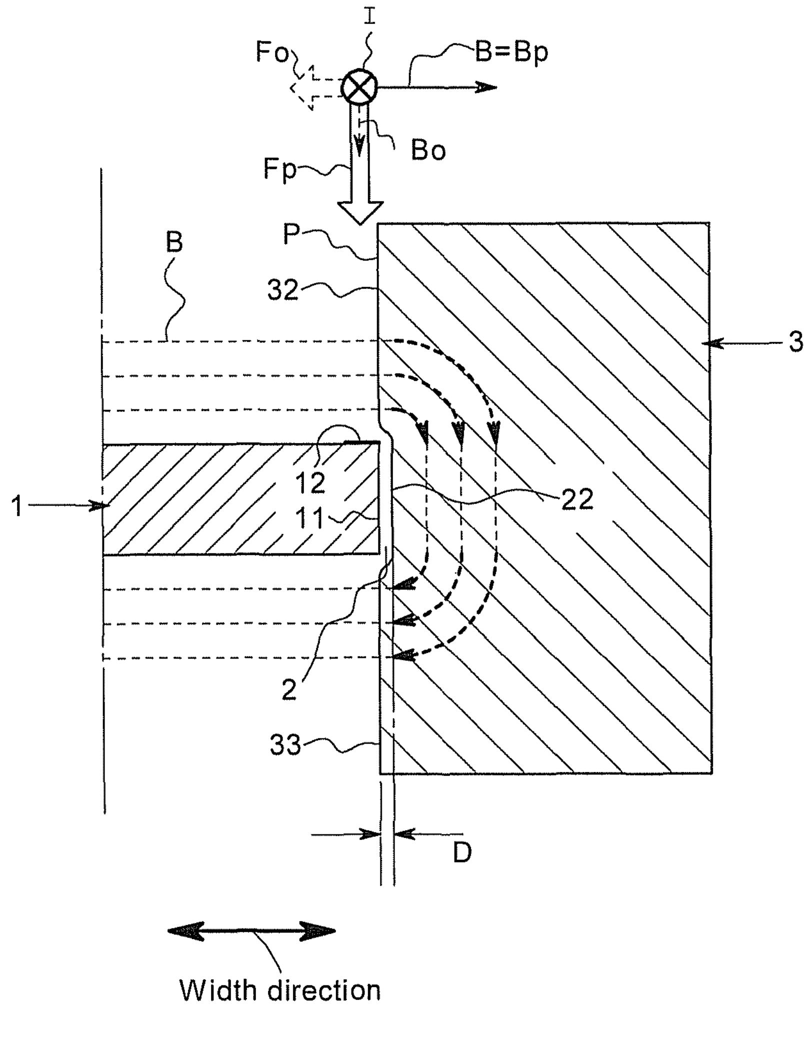
FIG. 4 is a cross-sectional view corresponding to FIG. 2 in which the flux guiding member provided with a concaved groove is arranged along the side surface of the plated steel plate.

In order to bring the flux guiding member 3 close to the side surface 11, a concaved groove 22 is preferably arranged on a wall surface 31 of the flux guiding member 3 as shown in FIG. 4. The depth of the concaved groove 22 is preferably set to match the insulating distance D. The wall surface 31 is divided to an upper wall surface 32 and the lower wall surface 33 by the concaved groove 22. The concaved groove 22 is configured by a groove bottom surface parallel to the side surface 11, an upper groove side surface connecting the upper wall surface 32 and the groove bottom surface, and a lower groove side surface connecting the lower wall surface 33 and the groove bottom surface. The upper groove side surface and the lower groove side surface are inclined. In order not to cause discharge between the corners of the side surface 11 and the boundary edges connecting the groove side surfaces and the wall surfaces 32, 33; the connecting portions of the groove side surfaces, the groove bottom surface, and the wall surfaces 32, 33 are formed to an arcuate surface. For similar purpose, the orthogonal distance between the corners of the side surface 11 and the boundary edges connecting the groove side surfaces and the wall surfaces 32, 33 is made to be greater than or equal to the insulating distance D. The cross-sectional shape of the flux guiding member 3 provided with the concaved groove 22 is a substantially C-shaped cross section.

By arranging the concaved groove 22 in the flux guiding member 3, the flux guiding member 3 can be brought close until the upper wall surface 32 and the lower wall surface 33 of the flux guiding member 3 overlap the virtually assumed vertical plane P. The magnetic flux (B) thus can be made orthogonal to the flux guiding member 3. Therefore, the Lorentz force (Fo), which becomes the cause of bias in the plating, can be effectively canceled out by using the flux guiding member 3 including the concaved groove 22.

Figure 5:
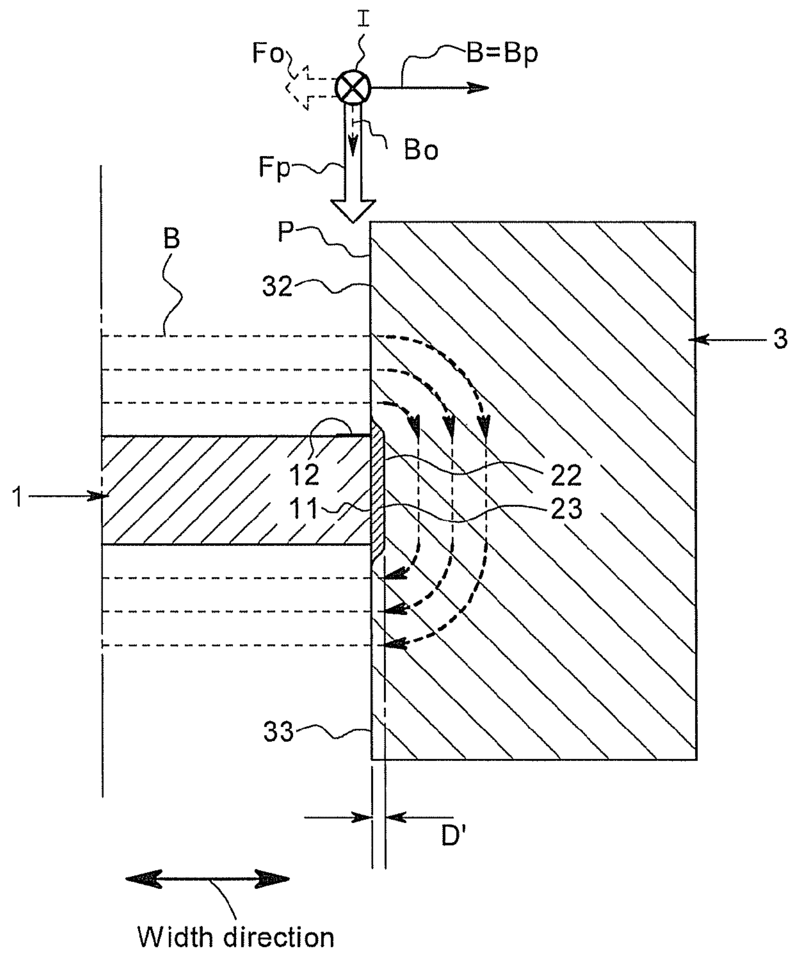
FIG. 5 is a cross-sectional view corresponding to FIG. 2 in which the insulating plate is fitted to the concaved groove.

When arranging the concaved groove 22 on the wall surface 31 of the flux guiding member 3, the insulating plate 23 having the same shape as the cross-sectional shape of the concaved groove 22 may be fitted, as shown in FIG. 5. With the use of the insulating plate 23, the flux guiding member 3 is brought into contact with the plated steel plate 1, and positioning of the flux guiding member 3 can be easily performed.

Considering only to have the magnetic flux B orthogonal to the upper wall surface 32 and the lower wall surface 33 orthogonal to the surface of the plated steel plate 1, it seems that the upper wall surface 32 and the lower wall surface 33 may be projected out toward the plated steel plate 1 beyond the vertical plane P that is in plane with the side surface 11. However, parallel surfaces opposing the upper surface and the lower surface of the plated steel plate 1, respectively, are formed if the wall surfaces 32, 33 projects too much. The magnetic flux (B) orthogonal to such parallel surface appears and possibly increases the orthogonal component (Bo). Therefore, the flux guiding member 3 is preferably arranged so that the wall surfaces 32, 33 are in plane with the vertical plane P in the state insulating distance between the groove bottom surface and the side surface 11 is D.

The flux guiding member 3 is arranged near the plated steel plate 1 to be heated, and hence is made of a material having heat resistance and high magnetic permeability. In particular, a material whose magnetic property does not change by temperature is used. For example, the flux guiding member 3 is made of an alloy of iron, permalloy, or the like. The permalloy refers to the alloy including iron and nickel, and has large magnetic permeability. The supermalloy in which molybdenum is added to iron and nickel, or the mumetal in which copper and chromium are added may be suitably used. The shape of the flux guiding member is preferably a solid block, where one surface of the block is the wall surface 31. In the example of FIGS. 1 to 5, the flux guiding member 3 is a long member. The flux guiding member 3 may be divided in the longitudinal direction of the plated steel plate to configure the flux guiding member 3 with plural blocks. If the flux guiding member 3 is configured by plural blocks, the handling is easy. The number of blocks is changed according to the length of the plated steel plate.

Although the flux guiding member 3 is separately required in the present invention, it does not require much cost and labor to prepare and arrange the flux guiding member 3. For example, the flux guiding member 3 can be easily and inexpensively manufactured and used by configuring the flux guiding member 3 with a solid iron block. Furthermore, if the flux guiding member 3 is configured by a permalloy block, the magnetic flux that enters to and exits from the flux guiding member 3 increases since the permalloy has high magnetic permeability, and hence the direction of greater amount of magnetic flux can be corrected. Therefore, the influence of the orthogonal component (Bo) contained in the magnetic flux can be more effectively reduced. The effects of the present invention are exhibited irrespective of the film thickness of the plating, and hence may be combined, for example, with the method of Japanese Unexamined Patent Publication No. 2010-070800.

What we claim is:

1. A method of heating a plated steel for quenching by directly applying a current to the plated steel plate, the method comprising the steps of:

connecting electrodes to the plated steel plate including a pair of side surfaces extending in a direction along which the applied current flows;

arranging a pair of solid metal blocks having high magnetic permeability, which have wall surfaces orthogonal to an upper surface of the plated steel plate, along the pair of side surfaces of the plated steel plate with an insulating gaps provided between the pair of side surfaces and the wall surfaces of the pair of solid metal blocks; and applying the current to the plated steel plate.

2. The method of heating the plated steel plate for quenching according to claim 1, wherein the current is applied with an insulating plates arranged in the insulating gaps between the wall surfaces of the pair of solid metal blocks having high magnetic permeability and the pair of side surfaces of the plated steel plate so that the insulating plates closely contact the wall surfaces of the paw of solid metal blocks and the pair of side surfaces of the plated steel plate.

3. The method of heating the plated steel plate for quenching according to claim 1, wherein the pair of solid metal blocks having high magnetic permeability includes a concaved grooves having a cross-sectional shape that encompasses encompass the pair of side surfaces of the plated steel plate extending in the direction along which the applied current flows, the concaved grooves being provided on the wall surfaces orthogonal to the upper surface of the plated steel plate.

4. The method of heating the plated steel plate for quenching according to claim 3, wherein the current is applied with insulating plates fitted into the concaved grooves of the member pair of solid metal blocks having high magnetic permeability so that the insulating plates closely contact the concaved grooves and the side surfaces of the steel plate.

* * * * *